(12) United States Patent
Jones

(10) Patent No.: US 7,364,375 B1
(45) Date of Patent: Apr. 29, 2008

(54) METHOD AND APPARATUS FOR SPLICING A FIBER OPTIC CABLE

(75) Inventor: Richard C Jones, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/640,601

(22) Filed: Dec. 18, 2006

(51) Int. Cl.
*G02B 6/255* (2006.01)

(52) U.S. Cl. .......................... 385/99; 385/95

(58) Field of Classification Search .............. 385/95, 385/99

See application file for complete search history.

(56) References Cited

U.S. PATENT DOCUMENTS 3,928,711 A * 12/1975 Jakobsen .................. 174/11 R

* cited by examiner

*Primary Examiner*—Jennifer Doan
(74) *Attorney, Agent, or Firm*—Bracewell & Giuliani LLP

(57) ABSTRACT

A method for splicing fiber optic cables to each other utilizes a splice tube of a glass material having a passage extending through it. A technician inserts ends of each optical fiber into the glass tube and abuts the ends of the fibers against each other. The technician applies a vacuum to the passage and heat to the glass tube. The heat softens the glass tube, and the reduced pressure in the passage draws the side walls of the glass tube tightly around the optical fiber ends.

20 Claims, 2 Drawing Sheets

METHOD AND APPARATUS FOR SPLICING A FIBER OPTIC CABLE

FIELD OF THE INVENTION

This invention relates in general to methods for splicing fiber optic cables, and in particular to a method employing a glass splice tube that is heated to shrink the tube around the abutted ends of the fibers.

BACKGROUND OF THE INVENTION

Fiber optic cables are in widespread use. Typically, a fiber optic cable has an optical fiber that is coated with a buffer coating. An elastomeric jacket surrounds the fiber. The jacket may include a strengthening material, such as carbon fibers.

Although protected by a jacket, fiber optic cables in some environments become damaged from time to time, particularly in military fighter aircraft. Fibers installed inside the boxes on the aircraft may be in protected environments with temperature control and vibration isolation, but the optical fiber cables installed in the open aircraft environment that connect the boxes and run with electrical wires are exposed to damage. If damaged, it may be necessary or expedient to remove the damaged area and reconnect portions of the original fiber optic cable with a splice. Alternatively, it might be preferred to splice part of the original fiber optic cable to a new section of fiber optic cable.

Splicing a fiber optic cable is a difficult task, particularly in the tight confines of military fighter aircraft. Replacing a single fiber optic cable can take days or even weeks under prior art repair processes. Because of the lack of space and a potentially dirty environment, it is difficult to meet the high requirements of an optical fiber splice.

One type of splice is a mechanical type that does not employ heat, rather uses a mechanical splice assembly to hold the ends together. The length of the optical fiber protruding from the buffer must be cleaved within about one thousandth of an inch. The end faces of the cleave must be perfect, with no hackles, burrs or angles. The mechanical process is difficult, and any deviation from the required tolerances will result in the splice failing.

Fusion splices employing heat are also made to optical fibers. With a fusion splice, the fiber ends are actually melted and fused together. Optical fibers for military aircraft are made of pure silica glass, which does not soften until a high temperature, such as 1,900° C. Generating that high of a temperature in the confines of an aircraft requires an electrical arc, which can be hazardous. Also, the fusion type repair equipment is large and expensive.

SUMMARY OF THE INVENTION

The method of this invention employs a splice tube of a glass material having a passage through it. A technician inserts an end portion of each optical fiber into the passage of the tube and abuts the ends. A heater element applies heat, and a vacuum pump reduces gas pressure within the tube to cause the tube to collapse or shrink around the abutted end portions of the optical fibers. When cooled, the splice tube rigidly holds the optical fibers ends in alignment.

Preferably the tube is transparent, so that the technician can see when the ends abut each other. The glass material for the tube is selected to have a softening temperature much lower than the optical fibers. The heat is controlled so that the temperature will not reach the softening temperature of the optical fibers.

Also, preferably the passage in the tube has end portions that are enlarged. The technician preferably strips back part of the buffer coating and also part of the jacket, exposing a section of optical fiber as well as a section of buffer coating. When inserting the optical fiber into the tube, the fiber will enter the central, smaller diameter portion of the passage, but the buffer coating is too large. The buffer coating enters the end portion of the passage, but the jacket is too large to enter.

Preferably the heating and evacuating step is performed with an assembly that has manifold portions for each end of the splice tube. The manifold portions form a seal around the outer diameter of the glass tube and around part of the fiber optic cable, such as the buffer coating. These two seals define a chamber, and a port leads from the chamber to the exterior. A vacuum pump connects by a hose to each port. Operating the vacuum pump causes the air or gas pressure in the passage to reduce relative to the pressure on the exterior of the tube.

The manifold is preferably split into two parts, and a clamp secures the two parts around the tube. The clamp has a jaw portion that clamps on the manifold and another portion that clamps around the jacket.

DETAILED DESCRIPTION OF THE INVENTION

Figure 1:
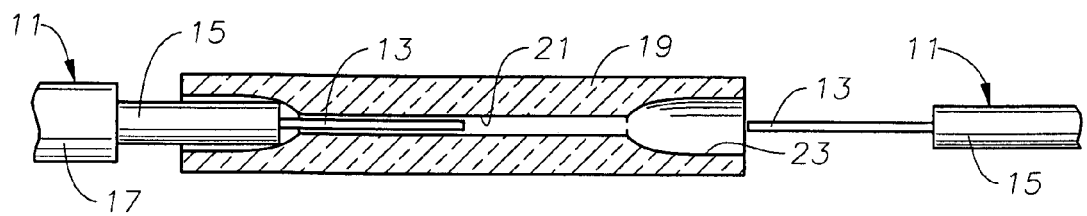
FIG. 1 is a sectional view illustrating a splice tube and a portion of two fiber optic cables being inserted into the splice tube.

Referring to FIG. 1, two sections of fiber optic cable 11 are shown in the process of being spliced together. The sections of fiber optic cable 11 may have originally been a single length, but a splice is needed after removal of a damaged section. Alternatively, one of the sections of fiber optic cable 11 may be a new section.

Each section of fiber optic cable 11 is conventional and has a central optical fiber 13 surrounded by a buffer coating 15. An elastomeric jacket 17 (shown in FIG. 1 only on the left side) surrounds buffer coating 15. Jacket 17 may have longitudinally extending carbon fibers (not shown) for strength. The technician has prepared the ends by stripping back from optical fiber 13 a portion of buffer 15 and stripping back from buffer 15 a portion of jacket 17. The end of each optical fiber 13 has been cleaved so as to be perpendicular to the axis. The stripping procedure exposes a portion of optical fiber 13 and a portion of buffer 15 of each cable.

A glass splice tube 19 forms a permanent part of the splice. The glass material of tube 19 has a much lower softening temperature than the material of optical fiber 13. For example for military aircraft, the glass material of optical fiber 13 is typically pure silica glass and has a high softening point, such as 1,900° C. The material of tube 19 may be a borosilicate glass or other type of glass, which, for example, may have a softening temperature of only about 725° C. Preferably, tube 19 is transparent or clear enough for a technician to see through it.

A passage extends axially through tube 19, having a central portion 21 and two end portions 23 in this example. Central portion 21 is smaller in diameter than end portions 23 and also longer in length. The intersection between central portion 21 and end portions 23 is a gradual curved transition. Preferably, the inner diameter of central passage portion 21 is slightly larger than the outer diameter of optical fiber 13, but smaller than the outer diameter of buffer coating 15. For example, if the diameter of optical fiber 13 is 125 microns, the inner diameter of central passage portion 21 is preferably about 128 microns (micrometers). For a typical military aircraft fiber optic cable having a 125 micron optical fiber 13, each passage end portions 23 may having an inner diameter of about 1 mm, although that dimension can vary considerably. The lengths of tube 19 and passage portions 21, 23 are not critical. In one embodiment, the entire length of tube 19 is about 1½-2 inches, and the minimum length of central passage portion 21 is about one-half inch.

Figure 2:
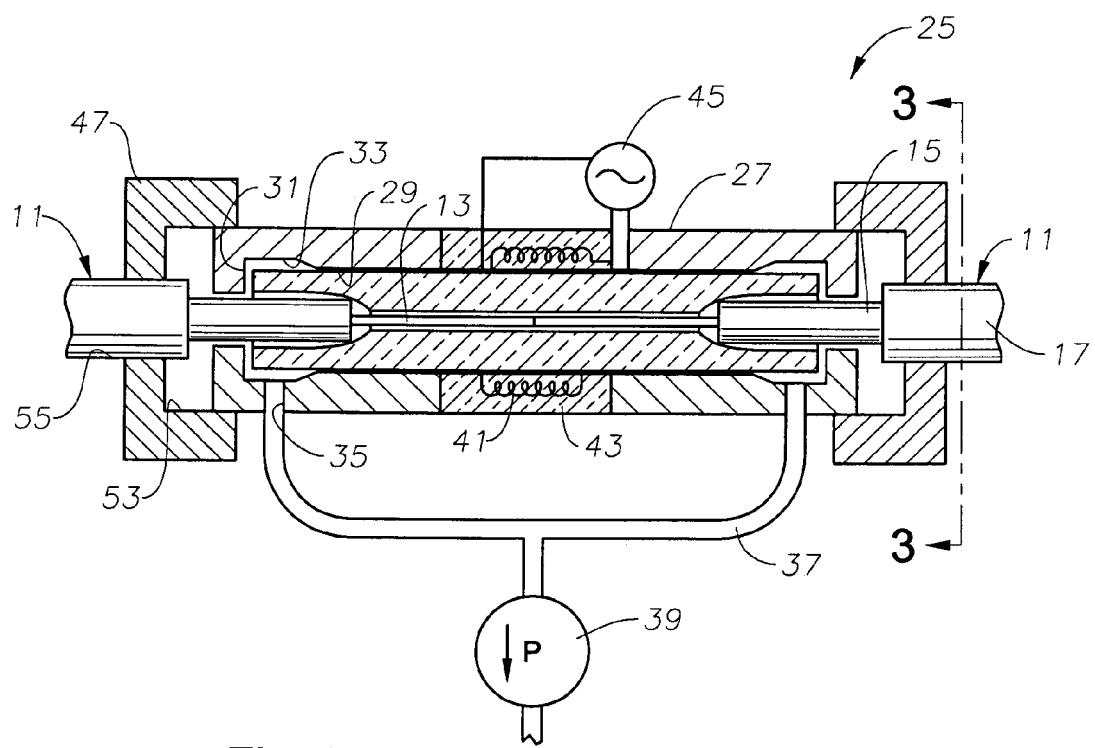
FIG. 2 is a sectional view of the splice tube of FIG. 1, shown installed within a manifold that is clamped to the two fiber optic cables.

As shown in FIG. 2, when each fiber optic cable 11 is stripped as described above, a portion of each buffer coating 15 will be in one of the passage end portions 23 when the cleaved ends of optical fibers 13 abut each other. It is not essential that the end portions of optical fibers 13 be identical in length, nor is it essential that buffer coatings 15 insert the full depth of passage end portions 23.

Referring to FIG. 2, a fixture assembly 25 is employed for forming the splice. Fixture assembly 25 includes a manifold 27, which is preferably split into two halves along its longitudinal axis. Each half has a longitudinally extending semi-cylindrical recess. When assembled together, the recesses within each half of manifold 27 form a cylindrical cavity that clamps closely around tube 19.

The cylindrical cavity includes a central cavity portion 29 that has an inner diameter substantially equal to the outer diameter of tube 19 to form a seal with the exterior of tube 19. The cylindrical cavity of manifold 27 has two end cavity portions 31 that define a smaller inner diameter than central cavity portion 29. The inner diameter of each end cavity portion 31 is substantially equal to the outer diameter of the exposed portion of buffer coating 15 in this example to form a seal with buffer coating 15. Alternately, the inner diameter of each end cavity portion 31 could be substantially equal to the outer diameter of jacket 17 for forming a seal on jacket 17.

The engagement of central cavity portion 29 with the outer diameter of tube 19 forms a low pressure seal. The engagement of each end cavity portion 31 with buffer 15 forms another low pressure seal. If desired, high temperature linings or coatings could be employed in cavity portions 29, 31 to enhance sealing, but a tight seal is not necessary.

Each cavity portion of manifold 27 between end cavity portion 31 and central cavity portion 29 is larger in diameter than central cavity portion 29 and defines a chamber 33. Each chamber 33 is in fluid communication with tube passage portions 21, 23, but sealed from the outer diameter of tube 19 and from the exterior of manifold 27 by the seal between central interior portion 29 and tube 19 and the seal between each end cavity portion 31 and one of the buffers 15.

A port 35 leads from each chamber 33 to the exterior of manifold 27. A hose 37 connects to each port 35. Hose 37 leads to a conventional vacuum pump 39. When vacuum pump 39 is operated, it will lower the gas pressure within tube passage portions 21, 23 relative to the gas pressure on the outer diameter of tube 19.

An electrical resistance heater element 41 is mounted in a thermally insulated section 43 and positioned around the central portion of tube 19. In this example, heater element 41 is mounted to a central portion of manifold 27. Insulated section 43 is located half-way between the opposite ends of manifold 27 and extends for a selected length. Heater element 41 is connected to a power source 45, schematically illustrated. If desired, insulated section 43 could be formed separately from manifold 27, and manifold 27 be formed into separate end pieces, each having a chamber 33 for engaging one of the ends of tube 19.

Figure 3:
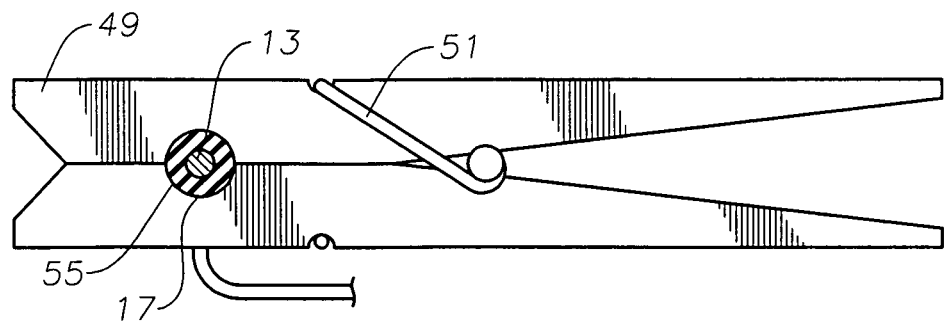
FIG. 3 is a sectional view of the assembly of FIG. 2, taken along the line 3-3 of FIG. 2, and illustrating one of the clamps.

A pair of clamps 47 is illustrated for clamping the halves of manifold 27 to each other and to the fiber optic cables 11. Clamps 47 may be of a variety of types and could be configured as a single clamp that clamps both ends of manifold 27 simultaneously. As illustrated in FIG. 3, each clamp 47 has two clamp halves 49 that are biased toward each other by a spring 51. Each clamp 47 in this example thus resembles a conventional clothes pin. As shown in FIG. 2, clamp halves 49 of each clamp 47 have jaws with two diameters. The larger diameter jaw portion 53 is sized for clamping over the exterior of an end portion of manifold 27. The smaller diameter jaw portion 55 is configured for clamping around jacket 17 of one of the fiber optic cables 11. Clamps 47 thus not only retain the two halves of manifold 27 to each other, but also retain the fiber optic cables 11 in the position of FIG. 2.

Figure 4:
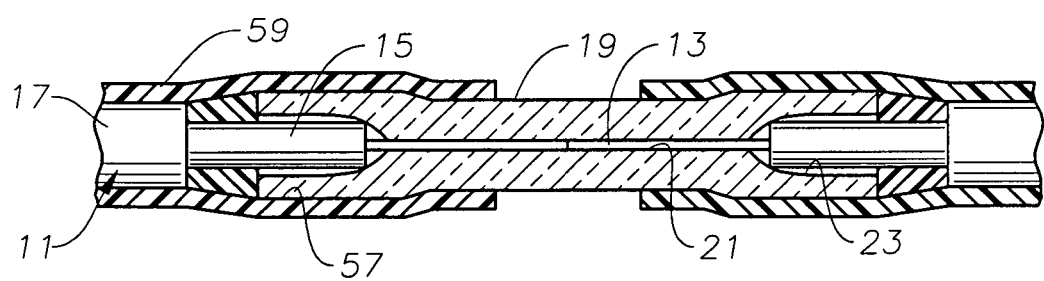
FIG. 4 is a view of the splice tube of FIG. 1, shown in a completed form.

To perform the splice, the technician preferably slides a heat shrinkable thermoplastic boot 59 (FIG. 4) along each fiber optic cable 11 a short distance from the end. The technician prepares the end of each fiber optic cable 11, as shown in FIGS. 1 and 2, cleaving and stripping an end portion of optical fiber 13 and an end portion of buffer coating 15. The technician inserts optical fibers 13 into passage central portion 21 and, by observing through the transparent tube 19, carefully positions them so that the ends of optical fibers 13 abut each other. This position places part of each exposed portion of buffer 15 within passage end portion 21. The end of jacket 17 will be spaced a short distance from an end of tube 19. Initially, there will be a small annular clearance between each optical fiber 13 and the inner diameter of passage central portion 21.

The technician places manifold 27 around tube 19, and places clamps 47 on each jacket 17 and on each end of manifold 27. Hoses 37 are connected between vacuum pump 39 and ports 35. The technician turns on pump 39 to reduce the pressure in passage central portion 21 and applies power to heater element 41. As the glass material of tube 19 softens, the lower pressure in passage central portion 21 causes tube 19 to collapse around in full 360 degree contact with optical fibers 13. When cooled, tube 19 becomes rigid again but in its collapsed configuration so that it firmly grips and supports optical fibers 13. The collapsing due to heat and vacuum removes any clearances between the inner diameter of passage central portion 21 and optical fibers 13. The passage end portions 23 do not collapse around buffer 15 in this example. The amount of heat is not sufficient to soften, melt or fuse the optical fibers 13.

After cooling, the technician removes clamps 47 and manifold 27. The technician may place a conventional sealant 57 around buffer coating 15 where it protrudes from tube 19. The technician slides each boot 59 down from each fiber optical cable 11 over the joint between each fiber optic cable 11 and tube 19. The technician applies heat to boot 59 in a conventional manner to cause it to shrink around the joint.

The method is quicker and easier to perform than the high tolerance mechanical splicing of the prior art. The method does not require the high temperatures required to fuse fiber optic ends together. The equipment to perform the method is simple to manufacture and inexpensive. Tolerances for cleaving are much broader than in the prior art.

While the invention has been shown in only one of its forms, it should apparent to those skilled in the art that it is not so limited but it is susceptible to various changes without departing from the scope of the invention.

I claim:

1. A method for splicing fiber optic cables to each other, each of the cables having an optical fiber therein, comprising:
   (a) providing a tube of a glass material having a passage therethrough;
   (b) inserting an end of the optical fiber of each fiber optic cable into the passage of the tube and abutting the ends against each other;
   (c) heating the tube to cause the glass material to soften; and
   (d) applying a vacuum to the passage in the tube to cause the tube to collapse around the abutted ends of the optical fibers.

2. The method according to claim 1, wherein steps (c) and (d) are performed simultaneously.

3. The method according to claim 1, wherein:
   each of the fiber optic cables has a buffer coating surrounding the optical fiber; and step (b) further comprises:
   stripping a section of the buffer coating from the optical fiber.

4. The method according to claim 1, wherein:
   each of the fiber optic cables has a buffer coating surrounding its optical fiber and a jacket surrounding its buffer coating; and step (b) further comprises:
   stripping a section of the buffer coating from the optical fiber;
   stripping a sufficient amount of the jacket from the buffer coating so that the jacket remains exterior of the passage in the tube when the ends of the fibers are abutting each other in step (b).

5. The method according to claim 1, wherein step (d) comprises:
   clamping a portion of a manifold assembly around each end of the tube to define a chamber at each end of the tube that is in fluid communication with the passage and sealed from an exterior portion of the tube;
   connecting a vacuum pump to each of chambers; and
   operating the pump to reduce a pressure within the passage relative to a pressure on the exterior of the tube.

6. The method according to claim 1, wherein step (c) comprises heating the tube to a temperature less than a softening point of the optical fibers.

7. The method according to claim 1, wherein:
   each of the fiber optic cables has a buffer coating surrounding its optical fiber and a jacket surrounding its buffer coating, and step (a) comprises:
   providing the passage with an enlarged diameter end portion at each end of the tube separated by a smaller diameter central portion, the inner diameter of the end portions being smaller than a diameter of the jacket, the inner diameter of the central portion being smaller than a diameter of the buffer coating; and step (b) comprises:
   inserting the optical fibers into the central portion and a portion of the buffer coatings into the end portions.

8. The method according to claim 1, wherein:
   each of the fiber optic cables has an elastomeric jacket;
   step (b) comprises:
   positioning a manifold assembly around each end of the tube, the manifold assembly having a chamber at each end of the tube that is in fluid communication with the passage and sealed from an exterior portion of the tube;
   clamping the manifold assembly to the jacket of each fiber optic cable;
   connecting a hose from a vacuum pump to each of the chambers; and
   operating the vacuum pump.

9. The method according to claim 1, wherein:
   step (a) comprises selecting the glass material of the tube to be transparent; and
   step (b) comprises observing the ends of the optic fibers as they abut each other.

10. A method for splicing fiber optic cables to each other, each of the cables having an optical fiber, a buffer coating on the fiber, and a jacket surrounding the buffer coating, the method comprising:
    (a) providing a tube of a glass material having a passage therethrough with a central portion having a first diameter and end portions having a second diameter, the first diameter being smaller than an outer diameter of the buffer coating, the second diameter being larger than the diameter of the buffer coating but smaller than an outer diameter of the jacket;
    (b) stripping from an end portion of each optical fiber a section of the buffer coating and stripping from the buffer coating a section of the jacket, thereby exposing an end portion of the optical fiber and an end portion of the buffer coating;
    (c) inserting the end portion of each optical fiber into the central portion of the passage of the tube and abutting the end portions of the optical fibers against each other, which positions at least part of the end portion of the buffer coating of each fiber optic cable within one of the end portions of the passage;
    (c) reducing a gas pressure in the passage relative to a gas pressure on an exterior of the tube; and
    (d) heating the tube to cause the glass material to soften and collapse around the abutted end portions of the optical fibers.

11. The method according to claim 10, wherein:
    step (a) comprises selecting a glass material for the tube that is transparent; and
    step (b) comprises observing the end portions of the optic fibers as they are inserted into the central portion of the passage.

12. The method according to claim 10, wherein step (c) comprises:
    placing portions of a manifold assembly around each end of the tube, defining chambers at the end of each tube that are in fluid communication with the passage in the tube and sealed from the exterior of the tube; and
    connecting a vacuum pump to each of the chambers and operating the vacuum pump.

13. The method according to claim 12, wherein:
    the portions of the manifold assembly comprise two longitudinally split members that are placed around the tube; and wherein the method further comprises:

providing a clamp assembly having a gripping jaw with a first section and a second section, the second section being smaller in diameter than the first section;

placing the first section of the clamp assembly around the split members of the manifold and clamping the split members of the manifold to each other; and placing the second section of the clamp assembly around the jacket of one of the fiber optic cables and clamping the clamping the clamp assembly to the jacket.

14. The method according to claim 12, wherein step (c) comprises:

mounting an electrical resistance heater element to the manifold assembly and supplying electrical power to the heater element.

15. The method according to claim 10, wherein steps (c) and (d) comprise:

providing a manifold that defines a central cavity portion of substantially the same inner diameter as an outer diameter of the tube and two end cavity portions of smaller inner diameter, the manifold further defining an end chamber between each of the end cavity portions and the central cavity portion, the manifold having a port leading to each of the chambers;

positioning the manifold around the tube such that each of the chambers is in fluid communication with one of the end portions of the passage in the tube, the central cavity portion forming a seal with an outer diameter of the tube, and the end cavity portions forming seals with the fiber optic tubes; and connecting a hose from a vacuum pump to each of the ports in the manifold and operating the vacuum pump.

16. The method according to claim 10, wherein:

step (a) comprises selecting the glass material of the tube to have a softening temperature point less than a softening temperature point of the optical fibers; and step (d) comprises:

heating the tube to at least to the softening temperature point of the glass material of the tube, but less than the softening temperature point of the optical fibers.

17. An apparatus for making a splice between two fiber optic cables, comprising:

a tube of a glass material having a passage therethrough for receiving an end portion of the optical fiber of each fiber optic cable;

a heat source for heating the tube to cause the glass material to soften;

a manifold that fits around at least one end of the tube and has a port in fluid communication with the passage; and a vacuum source coupled to the port so that a reduced pressure less than ambient pressure surrounding the tube can be applied to the passage in the tube while heated to cause the tube to collapse around the end portions of the optical fibers.

18. The apparatus according to claim 17, wherein the passage has a reduced diameter central portion and enlarged diameter end portions.

19. The apparatus according to claim 17, wherein:

the manifold has a longitudinal axis and is split along the axis into two separate members; and the apparatus further comprises:

a clamp for clamping the members of the manifold around the tube and to each other.

20. The apparatus according to claim 17, wherein the tube is transparent.

\* \* \* \* \*